(12) United States Patent
Colligan

(10) Patent No.: US 9,061,820 B2
(45) Date of Patent: Jun. 23, 2015

(54) REUSABLE, RECYCLABLE, COLLAPSIBLE FLUORESCENT TUBE CONTAINER

(76) Inventor: Michael Colligan, Uxbridge (CA)

( * ) Notice: Subject to any disclaimer, the term of this patent is extended or adjusted under 35 U.S.C. 154(b) by 215 days.

(21) Appl. No.: 13/581,459

(22) PCT Filed: Feb. 18, 2011

(86) PCT No.: PCT/CA2011/000191
§ 371 (c)(1),
(2), (4) Date: Aug. 27, 2012

(87) PCT Pub. No.: WO2011/100833
PCT Pub. Date: Aug. 25, 2011

(65) Prior Publication Data
US 2013/0008817 A1    Jan. 10, 2013

(51) Int. Cl.
*B65D 85/00*    (2006.01)
*B65D 85/42*    (2006.01)
*B65D 5/50*    (2006.01)

(52) U.S. Cl.
CPC .............. *B65D 85/42* (2013.01); *B65D 5/5059* (2013.01)

(58) Field of Classification Search
CPC ........ B65D 85/42; B65D 81/05; B65D 81/02; B65D 5/5059

USPC ......... 206/419, 422, 418, 446, 443, 589, 583, 206/523
See application file for complete search history.

(56) References Cited

U.S. PATENT DOCUMENTS

| | | | |
|---|---|---|---|
| 2,401,765 A * | 6/1946 | Kuhlman | 206/68 |
| 2,564,729 A | 4/1951 | Sheppard | |
| 3,191,846 A * | 6/1965 | Desmond | 229/125.19 |
| 3,193,095 A * | 7/1965 | Martino et al. | 206/419 |
| 3,804,237 A * | 4/1974 | Christensen et al. | 206/451 |
| 5,553,708 A | 9/1996 | Lawrence | |
| 5,826,722 A * | 10/1998 | Phillips | 206/419 |
| 5,842,568 A * | 12/1998 | Chang-wen et al. | 206/419 |
| 7,299,926 B2 * | 11/2007 | Russell et al. | 206/583 |
| 7,631,758 B2 | 12/2009 | Stennes | |

FOREIGN PATENT DOCUMENTS

| | | |
|---|---|---|
| EP | 0 047 694 A2 | 3/1982 |
| EP | 0 796 785 A2 | 9/1997 |

* cited by examiner

*Primary Examiner* — Steven A. Reynolds
(74) *Attorney, Agent, or Firm* — Andrew W. Chu; Craft Chu PLLC

(57) ABSTRACT

There is a reusable and recyclable storage and shipping container for fluorescent lamp tubes, particularly linear fluorescent lamps commonly used in commercial and industrial fixtures.

14 Claims, 8 Drawing Sheets

REUSABLE, RECYCLABLE, COLLAPSIBLE FLUORESCENT TUBE CONTAINER

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The field of the invention is reusable and recyclable storage and shipping containers for fluorescent lamp tubes, particularly linear fluorescent lamps commonly used in commercial and industrial fixtures.

2. Description of Related Art Including Information Disclosed Under 37 CFR 1.97 and 37 CFR 1.98.

Recycling systems and methods to manage failed (spent), linear fluorescent tubular lamps, the most common source of artificial light, are becoming increasingly vital as societies seek to reduce the devastating impacts of pollution. All levels of government and industry struggle to prevent persistent mercury contamination from the improper handling and disposal of waste lamps. It is apparent that existing storage technology, shipping and transportation and disposal infrastructure cannot meet existing industry needs or government regulations, let alone minimize pollution, stem the bio-accumulation of mercury or prevent the exposure and contamination of people and property.

Mercury, a proven neurotoxin, is reported to seep into human bodies unwittingly, through chronic, low-level and incidental exposure, which in the long run can trigger a myriad of health problems. Mercury exposure has been reported as linked to increased risk of heart attack, birth defects and other neurological disorders. Exposure to mercury vapor (found in used fluorescent lamps) is reported to damage the central and peripheral nervous systems, lungs, kidneys, skin and eyes. It is also mutagenic and affects the immune system.

It has been suggested that a complete ban on the substance should be implemented. This argument, however impractical, is not completely without merit when one considers how irresponsibly waste mercury products are managed. The recovery rates of waste fluorescent lamps, even in the most environmentally conscious jurisdictions, are below 50%. Some jurisdictions, such as Ontario, could not legitimately boast a recovery rate above 25%. This gap between the number of lamps sold and the amount recovered numerically accounts for part of a steady bio accumulation of toxic mercury, in an industrially altered form, in an uncontrolled fashion, well above its naturally occurring rates.

Reportedly there are a multitude of current and future health and economic consequences to this steady release of poison. A powerful example in Ontario is the detailed and specific recommendation by the Ministry of the Environment with respect to fish consumption. Fish in Ontario are polluted with mercury and other toxins. The ministry regularly releases extensive sport fish consumption advisories. For example, the current, 294 page long, advisory is specific with respect to the sizes of fish, species of fish, lakes, parts of lakes, regions, times of the year, types of contamination, fish anatomy and so on. Quotes from the "Guide to Eating Sport Fish 2009-2010" illustrate the scope of concern well:

" . . . eating contaminated fish regularly may result in accumulation of contaminants in the body to levels that can become a health concern."

and,

"Mercury is the cause of most consumption advisories in inland water bodies. Mercury is evenly distributed in fish flesh and there is nothing you can do to reduce or remove it"

Studies show that mercury from man-made sources is finding its way into our ecosystems, polluting our environment, harming our health, destroying renewable resources, compromising our food supply and ruining viable industries and damaging the economy as a whole.

The problem is that mercury is a very useful substance. It is unique in that in its solid form it actually has many of the properties of a liquid, including the ability to form a vapor. It is irreplaceable for a variety of industrial and commercial uses. Mercury makes artificial lighting systems much less dependent on energy than non-mercury sources. For example, incandescent and halogen light sources (non-mercury) create between 10-20 lumens per watt, while linear fluorescent T8 and T5 sources are able to emit 80 to 100 lumens per watt, 4 to 10 times more efficient. The use of mercury in linear fluorescent lamps substantially reduces our consumption of electricity, the generation of which is a major source of greenhouse gases and other air contaminants including mercury. Furthermore, if reliable systems and methods are implemented and regulations enforced, it is conceivable that societies could recover more than 99% of the mercury used in high efficiency lighting systems with the technologies already existing. However, the necessary clean energy that mercury prohibition would require cannot be created. Essentially, banning mercury use would be trading a pollution stream which can be mitigated for one that cannot.

All known fluorescent lamps manufactured to date contain mercury. If the lamp is not destroyed at a facility equipped with mercury management capabilities, the mercury will be released into the environment. There will be a mercury vapor release into the air when the glass envelope is breached by cracking, sail failure or general breakage. Mercury solids will form and embed in the glass or melt together into particulates. The small solid particles will immediately find their way into the environment. Finally, the mercury embedded in the glass will leach out slowly over time.

The realization of this steady contamination has given rise to specialized facilities which mechanically break up the waste lamps in processes which separate the various materials and contain and confine the mercury. Eventually the mercury is retorted and sold back into the raw materials market. There are a multitude of competing technologies which are offered as reliable and effective. Because the cost to process the lamps is significantly higher than the value of the extracted material, the end user must bear the additional costs to process the waste and the risk of doing it properly. This is called extended user responsibility.

The locus of the problem is not in producing the lamps, shipping new lamps to users or processing spent lamps to retort mercury. These activities are all performed by professionals. The heavy contamination occurs in the phase when the lamps operational life has ended and it needs to get to a waste facility with mercury management capabilities. Essentially, this once asset has depreciated completely, lost its commercial value, and been transformed into a toxic liability that needs to be stored, transported and disposed of properly. At this crucial moment, the toxic liability is often in the hands of someone or some organization which has little training at the site of work and minimal knowledge or understanding of what is at stake. Furthermore, this person or corporation, unlike their professional counterparts at lamp manufacturing and disposal facilities, stands only to lose money. The philosophy of extended user responsibility in the absence of affordable and properly managed storage and handling solutions, along with inadequate awareness creation on site, combined with minimal enforcement of government regulations translates into poor recovery rates and a steady stream of toxic pollution across the world.

It is in this stage of lamp life that the chance of contamination increases exponentially. Spent lamps are leaned against walls, stuffed back into original packaging in a hurried manner, thrown into garbage bins, dumped at waste transfer facilities or bulk stored for years. Most often, lamps are stuffed into random cardboard boxes with the glass jackets impacted upon and/or pressing up against one another. This is a particularly vulnerable position and should be avoided. When they are booked for a recycling effort they are shipped in a much less stable individual and bulk packages than when shipped to customers by the original equipment manufacturers. When the lamps glass jackets are packed next to one another breakage is impossible to avoid. This is exacerbated further when multiple boxes containing spent lamps packaged in this manner are stacked on top of each other for bulk shipping on pallets.

Furthermore, the people who are typically conducting the shipping and handling are rarely aware that the air inside a fluorescent lamp is under pressure. On some occasions, the destruction of a fluorescent lamp will create a minor explosion. If they are stored in a box with the glass jackets touching each other the chances of creating an explosion increases. Furthermore, the breakage of one lamp can set off a chain reaction explosion of all lamps in the box and even on a pallet.

Due to irregular and random bulk storage and shipping methods these explosions and contaminations can occur at any point in the supply chain; including the lamp user's facility, the trailer or shipping vehicle, consolidation points, and the lamp recyclers receiving warehouse and initial sorting area. Maintenance personnel, electrical contractors, delivery truck drivers, recycling facility receivers, and the people who clean shipping trailers can be consistently exposed to low levels of mercury vapor over long periods. As a result of this inconsistent packaging and shipping, dangerous levels of mercury slowly accumulate unknowingly into various real assets. Concrete, a porous substance and common building material is particularly vulnerable. For fluorescent lamp recycling facilities, who continuously receive and process haphazardly packed fluorescent lamps, it is only a matter of time before the buildings become so contaminated with mercury that remediation is impossible and the building has to be destroyed or left vacant, there are multiple examples of this in the United States.

The lamp manufacturers have well established and effective systems to deliver newly manufactured lamps to customers. Most of these rely upon factory assembled packaging of multiple units together combined with shipment in bulk to maintain and ensure breakage free (including cracking and seal failures) shipment and use. Special packaging and handling has long been the norm. Principal methods today involve parallel placement of multiple tubes into the long sides of rectangular containers or boxes. Individual tubes are separated from each other by thin individual sleeves or complex 3-part spacers but generally treated as a single bulk unit. These methods take into account that "new" or unused lamps are 'less toxic'. Cost effectiveness and minimal breakage is assured by volume production, tight packing, separation of glass jackets, and special handling along with high unit count packages delivered to the outlet and then the user preferably in those bulk situations. It is estimated that more than 99% of new lamps travel from factory to the site of actual use without being broken.

These methods rely extensively upon the careful handling and organization of the bulbs and all of the required packaging components throughout the transit time from individual production to actual use or very close to it. Furthermore, original equipment manufacturers never package lamps with glass jackets touching one another due to the exponentially increased chance of breakage and explosion during shipping and handling.

Unfortunately, 'old\ used or spent tubes contain and will release toxic mercury vapor when the glass jacket is compromised. Reuse of original packaging, the most common form of storage for waste lamps, is problematic at best and impossible in many instances.

Examples of effective new lamp packaging are shown in Sheppard U.S. Pat. No. 2,564,729 issued Apr. 21, 1951 and the more modem equivalent trade packaging which uses a 2-part end piece of essentially the same configuration without the fold lines 36 and 37.

Another is shown in Lawrence U.S. Pat. No. 5,553,708 issued Sep. 10, 1996 which encases each lamp in a protective tube and then close-packs the assembly in a shipping container.

These factory systems are impossible to replicate in a storage room or construction site as spent lamps start their processing in a highly disorganized state. Moreover, most maintenance personnel will go through a box of lamps over a period of time and will not wish to mix spent lamps with new lamps creating a storage void during that period.

Furthermore, most lighting upgrades remove tubes which are of a wider diameter (T12, T17) and replace them with more efficient lamps of a lesser overall diameter (T8, T5).

Thus, reuse of packaging during an upgrade is limited to a low percentage of the waste lamps. In these scenarios the boxes are reused but the spacers and systems to prevent the glass jackets from pressing against one another, found in Sheppard and Lawrence 165 (U.S. Pat. Nos. 2,564,729 and 5,553,708 respectively) are absent creating the conditions for a mass explosion and release of mercury vapor.

It has been found that collection, storage and return of failed bulbs to any recycling facility in an undamaged condition is a significant challenge despite ongoing efforts to avoid mercury contamination and increase the diversion of waste from landfill. Much damage results from the rough use of inappropriate, but handy, existing packaging without all internal components, mixing parts and incorrectly, partially filled containers and storing waste lamps with the glass envelopes touching one another. The result is that many failed bulbs still end up in landfills and that those who wish to recycle often end up contaminating their own facility or that of others.

Experience tells us that these factors add greatly to both the percentage of improperly disposed of lamps, instances of contamination and dangerous mercury releases.

Various efforts have been made to address the problem, as shown in the prior art, but most only address the symptom, namely the release of mercury from breakage during shipping and storage of lamps. The assumption of the prior art is that this accidental destruction is dangerous yet unavoidable given existing personnel and equipment on site and that the solution needs to manage and contain minor yet continuous releases of mercury vapor. U.S. Pat. No. 7,631,758 issued Dec. 15, 2009 on Stennes is an example of concern for mercury contamination and an acceptance of unavoidable, widespread, consistent breakage of failed lamps. Furthermore, U.S. Pat. No. 7,631,758 does not address the single most important function of glass tube storage and shipping: preventing the glass jackets from touching one another during shipping, handling and storage.

SUMMARY OF THE INVENTION

It is an objective of the present invention to provide an uncomplicated and inexpensive assembly, storage and shipping container suitable for both new and failed fluorescent tube bulbs.

It is a further object to provide a container which may be quickly assembled and used highly effectively by unskilled maintenance personnel without significant training, direction or review of assembly instructions.

It is a still further object to provide a container which, when used properly, provides the opportunity to minimize to the point of negligible the number of bulb breaches or failures throughout the whole period from the time of removal of the individual bulb from its lighting fixture, its intermittent storage, to the time of actual controlled destruction for recycling.

It is another object of the invention to provide a specialty container which itself is both simple and inexpensive to manufacture using existing technologies, and is simply, quickly and without instruction reusable and recyclable while being collapsible even with multiple uses and rough handling in routine shipping. An additional objective is that the filled containers be readily stackable on standard shipping pallets, preferably 4 per skid.

DETAILED DESCRIPTION OF THE DRAWINGS

In the preferred embodiment all components are fabricated from extra strength cardboard, further preferably of 2 laminated layers. The insertable transverse tube supports are sized to fit within the interior perimeter of the container for a releasable high interference friction and mechanical fit without significant deformation of the side walls or the supports.

Figure 1:
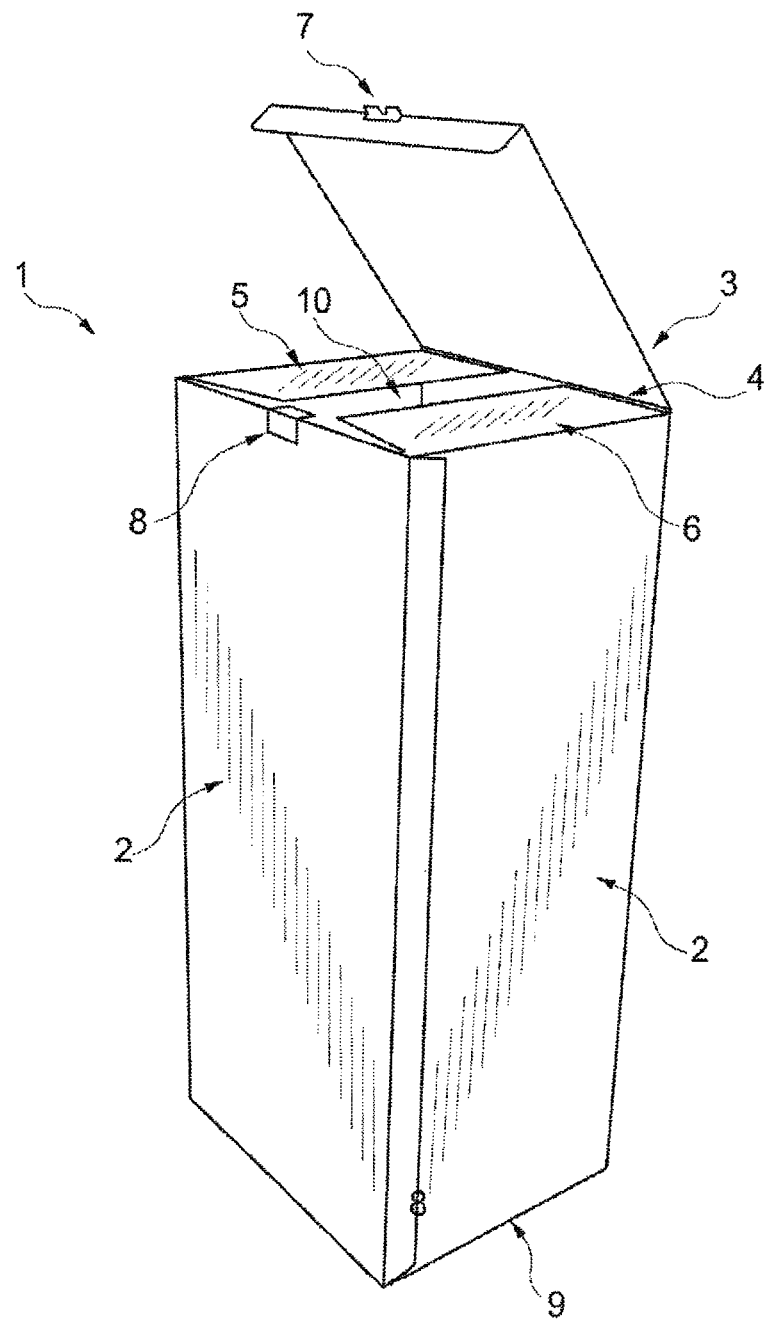
FIG. 1 is a perspective view of the fully assembled preferred embodiment of the container of the invention in an upright and open condition, ready for receipt of spent fluorescent tube lamp storage or shipment.

As shown in FIG. 1 the container of the invention 1 is depicted in fully assembled and open condition. Elongated and extended exterior side walls 2 fully enclose interior 10 in sufficient length to accommodate both the spent tube lamps end-wise and the insertable transverse layers between fold down top 3 and closed in bottom 9. Top 3 is secured to a side wall 2 as by folding along line 4. Flaps 5 and 6 are similarly folded in from other opposing sidewalls. Preferably the top 3 and side wall 2 are mechanically secured for closure as by closure tab 8 and receptacle 7.

Figure 2:
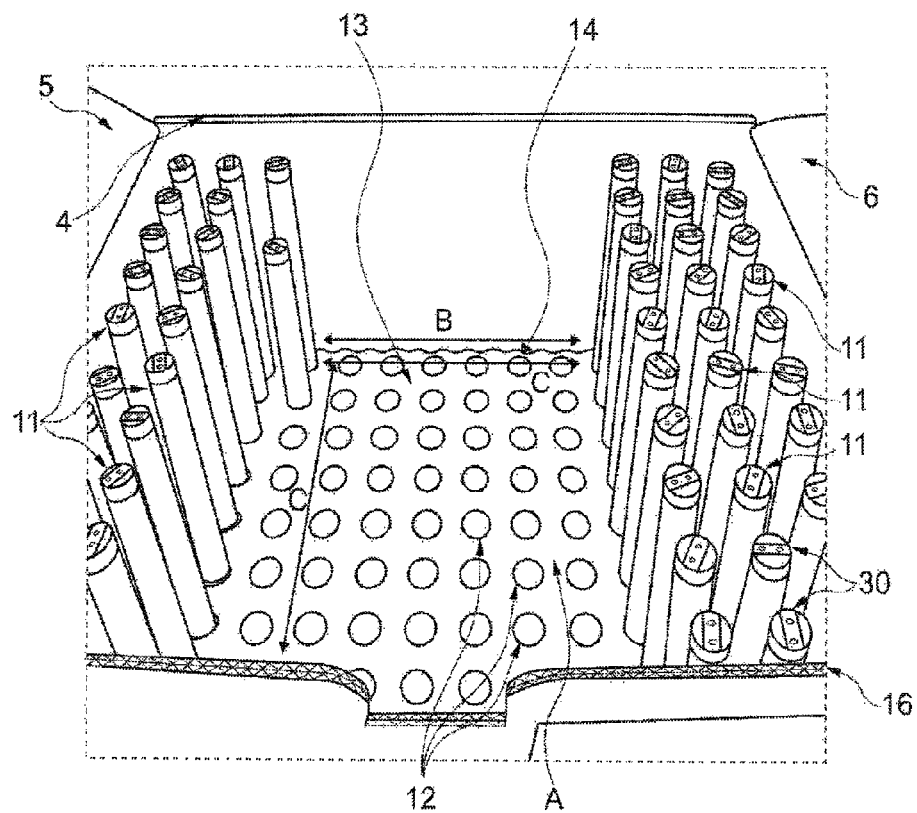
FIG. 2 is a partial upper perspective view of the interior of the container of FIG. 1 in a storage condition with its top opened, displaying the interior of the container partially filled with spent fluorescent tube lamps and the upper support insertable layer 13.

Preferably, all cardboard layers of the container 1 are formed of a plurality of laminated layers 16 as shown in FIG. 2.

Figure 2A:
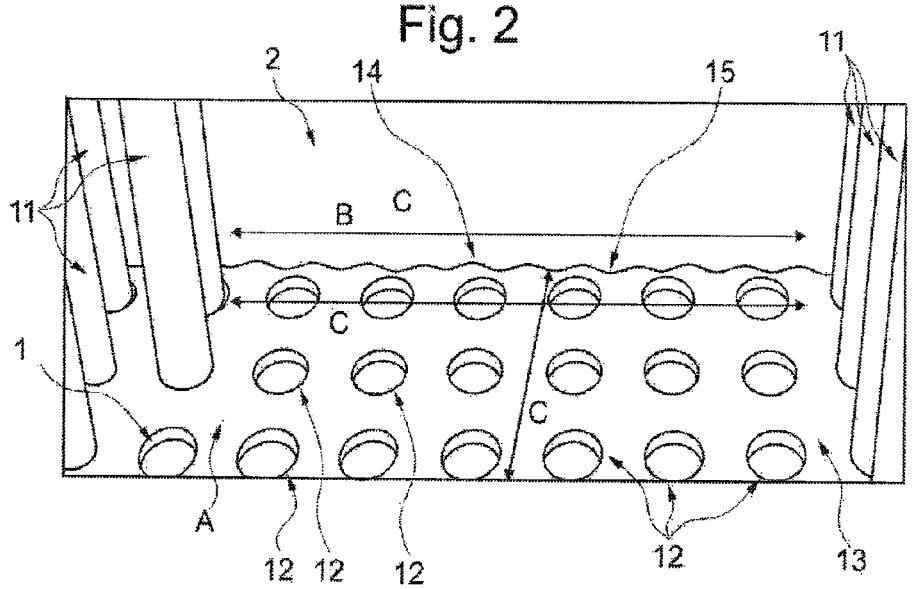
FIG. 2a shows a close up perspective view of a portion of the interior of the container shown in FIG. 2.

In FIG. 2 and the close up FIG. 2a, the container of the invention 1 is shown in fully open and assembled condition partially filled with spent lamp tubes 11. Closure flaps 5 and 6 are folded out of the way and end flap 3 is folded fully back along line 4.

A plurality of spent lamps 11 are inserted vertically along the main axis into holes 12 in insertable transverse support layer 13. Holes 12 are arranged in a matched pattern array as at A and are spaced apart a minimum distance of about ½ of a tube diameter to separate each tube from its neighbor. Preferably holes 12 are sized to loosely fit individual lamps 11.

Support layer 13 includes a gripper edge 14 comprising a plurality of serrations 15 to form an enhanced mechanical and frictional bond between layer 13 and extended side wall 2 sufficient to substantially retain layer 13 in a transverse position. Preferably gripper edge 14 extends and engages the full width of each side wall 2 as depicted at B in FIG. 2 and maintains support layer 13 in a fully transverse configuration across both transverse dimensions C, FIG. 2a with some but without significant deformation of either the side walls or the support layer in proximate areas.

FIG. 2a shows a close up of FIG. 2.

Preferably at least a pair of insertable lamp support layers 13 of the container 1 of the invention are assembled into transversely of the container intermediate the ends so that their respective hole array patterns A match between the layers and provide a close fitting loose vertical or lateral support for spent lamps 11.

Holes 12 may be irregular (non-circular) in order to provide a cushioned frictional fit.

Figure 3:
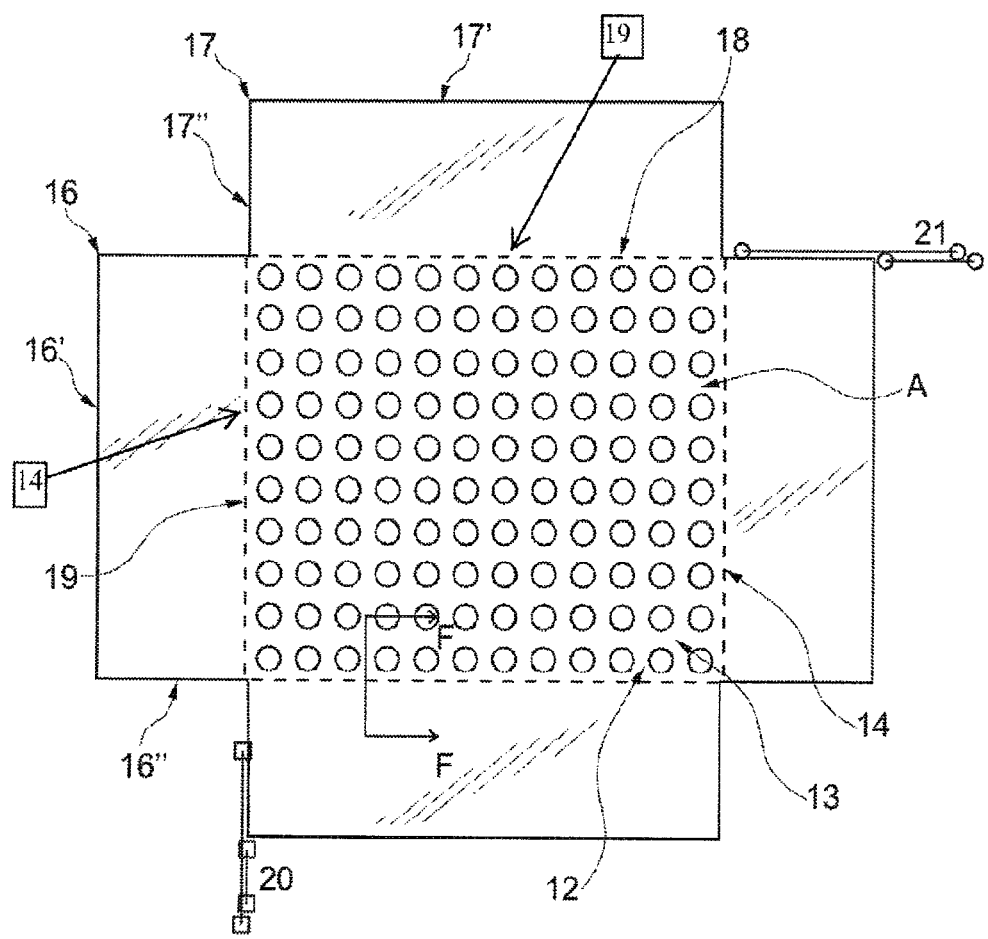
FIG. 3 is a plan view of the horizontal lamp-support insertable layer fully extended.
Figure 4:
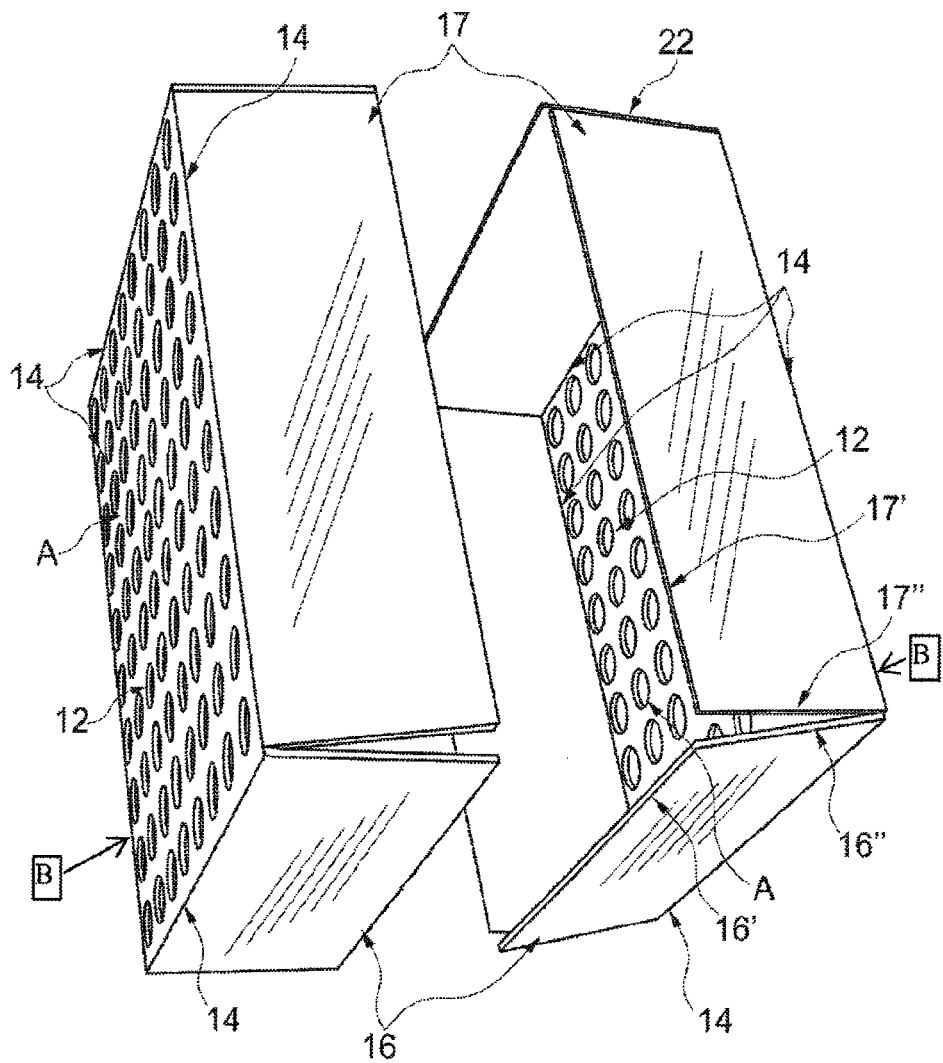
FIG. 4 is a pair of perspective views of a horizontal support insertable layer as shown in FIG. 3 with the flaps folded over along edges A and B in an as-used position.

Insertable lamp support layer 13 is depicted unfolded flat in FIG. 3. Layer 13 is sized so that when folded along lines 19, as in FIG. 4, tabs 16 and 17 form a closed rectangular box structure whose dimensions 16 and 17 as shown in FIG. 3, are slightly larger than the dimensions of the interior of the container 1 for a controlled and tight interference fit. Preferably the flap edges 16" and 17" abut one another upon insertion as shown in FIG. 4.

Further preferably, at least an opposite pair of dimensions 16' and 17' are slightly smaller than the corresponding dimensions of layer 13, as at 20 and 21 in FIG. 3, to ensure that the flaps 16 and 17 abut one another when folded without undue compression damage to edges 16" and 17" and to retain flaps 16 and 17 generally planar. The combination of dimensions ensures a tight mechanical and frictional fit between the transverse folded support layer 13 and the interior of container 1 over the whole of the surfaces of flaps 16 and 17 as well as along gripper edge 14. Transition of the support layer 13 between flat, folded and inserted states is simple and may be accomplished, without error in one quick motion, into exactly the right position upon either insertion or removal. Thus, it can be seen that repeated action and reuse will cycle container parts in a specifically defined and located sequence of events without complex folding or interleaving.

Figure 5:
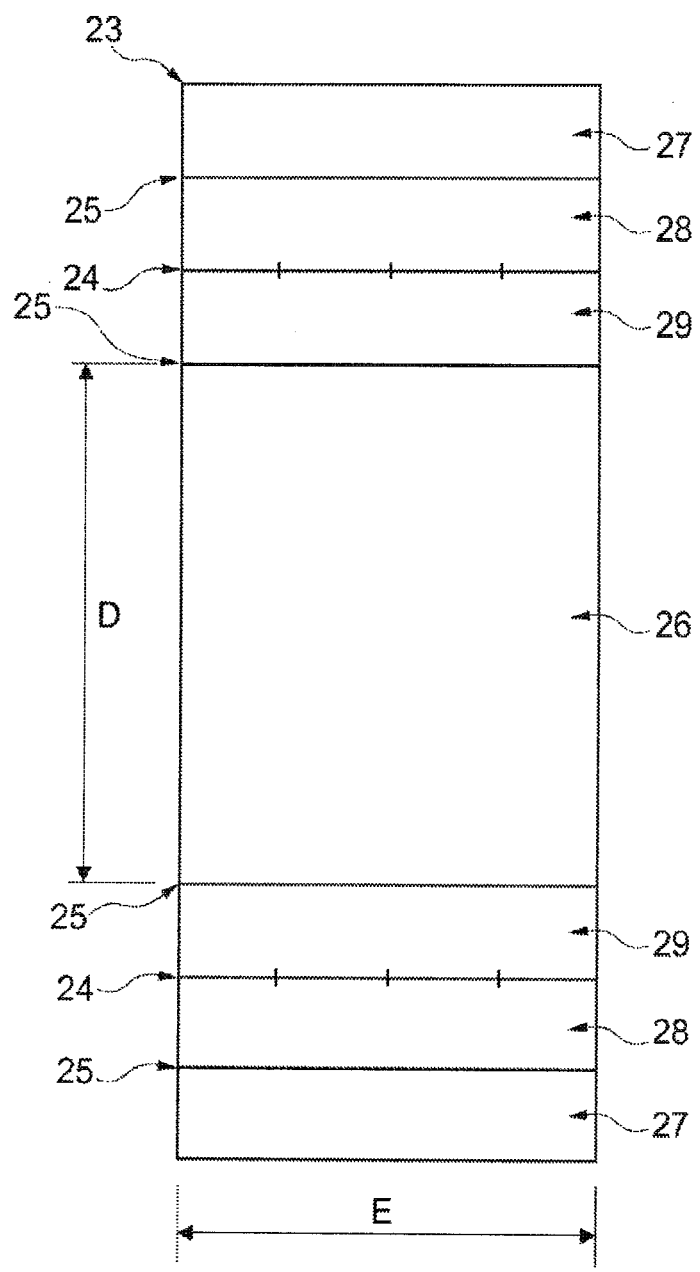
FIG. 5 is a plan view of the lamp base support insertable layer fully extended.

Gripper edge 14 is formed by a series of evenly-spaced-apart, preferably elongated, perforations 18 along and forming a fold line 19 between insertable layer 13 and flaps 16 and 17, FIGS. 2, 3 and 5. Preferably perforations 18 are linear cuts as depicted in FIG. 8 evenly spaced along the fold line 19 sufficiently spaced apart to form multiple serrations 15 of uniform dimensions as shown in FIGS. 2 and 2a and also to ensure integrity of the cardboard between the perforations over repeated folding, unfolding and use.

Additionally, cardboard in the area of perforations 18 may be slightly compressed before the perforations are added to aid in assembly and formation the serrated gripper edge 14. FIG. 8 shows a cross-sectional view taken along line F-F in FIG. 3. Layer 13 is foldable about fold line 40 so that flap 16 will extend downward (in this FIG. 8) at a right angle to layer 13. Preferably layer 13 is composed of a double layer cardboard with an upper corrugated layer 48 and a lower corrugated layer 49 joined together with a common boundary layer 50. Upper layer 48 is cut along fold line 40, 19 as at 41 to, but not through, the boundary layer 50 to facilitate folding and shape retention.

Further preferably lower layer 49 is compressed in the areas to either side of the line 40 to a distance 43 and at an angle 45. Cardboard in the area 46 may be fully compressed. Additionally, in the area of perforations 18 the lower layer 49 may be allowed to bulge as at 47.

Figure 8:
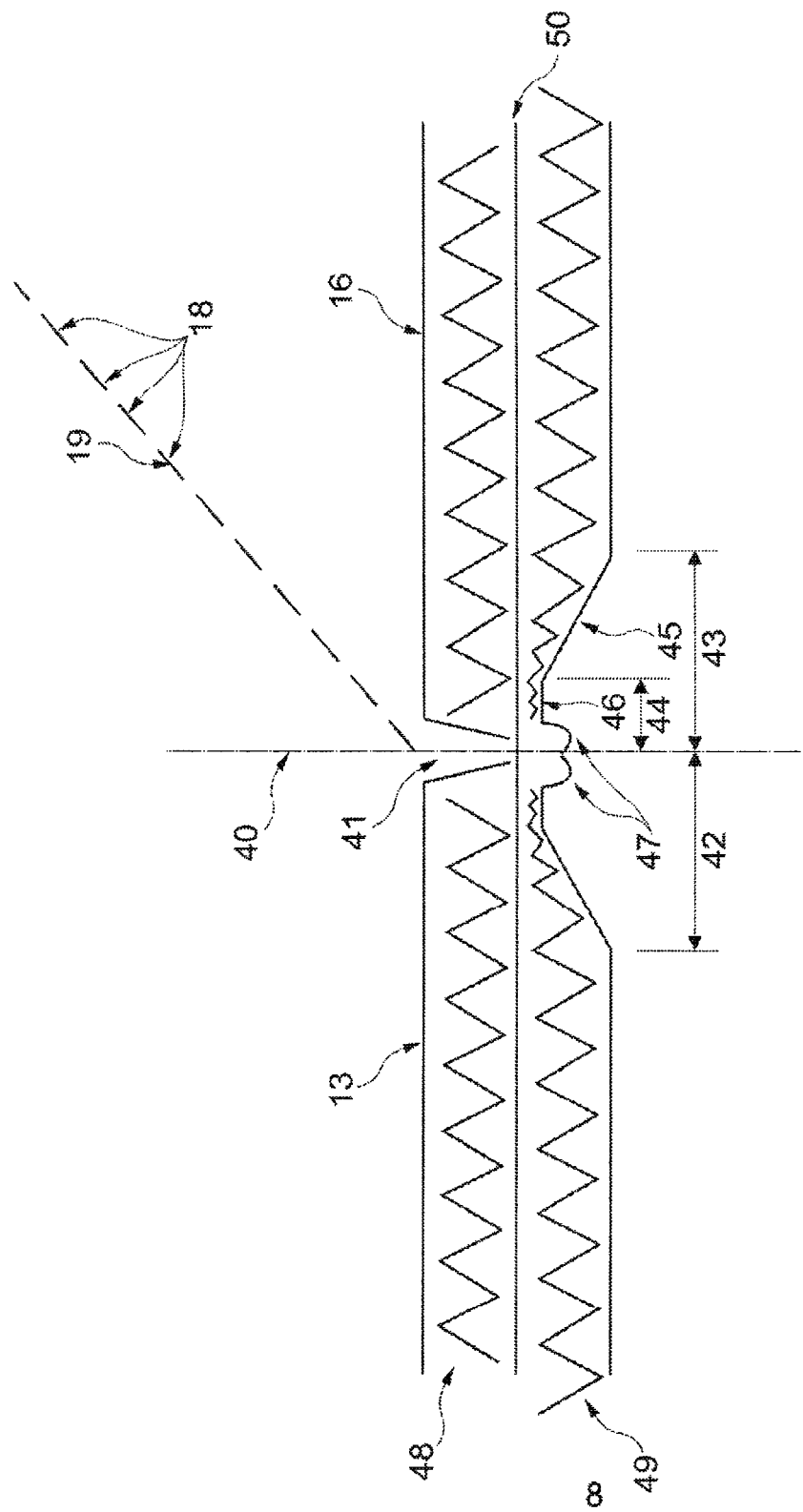
FIG. 8 is a cross-sectional elevation view taken along line F-F in FIG. 3.

Alternatively, one surface of each of the lamp support 13 is partially or completely scored along fold lines 19, 40 as at 41 in FIG. 8, to ensure that the perforations in the fashion of a dashed line leave a wavy serrated edge as is shown at 15 between the arrowed lines on FIG. 2. The wavy serrated edge provides for manageable insertion of the support layer 13 in co-operation with the breadth of the tabs 16 and 17 and a strong interference fit with the container side wall 2 which, preferably, deforms both the 305 gripper edge of the support layer 13 and the sidewall of the container 2.

Figure 6:
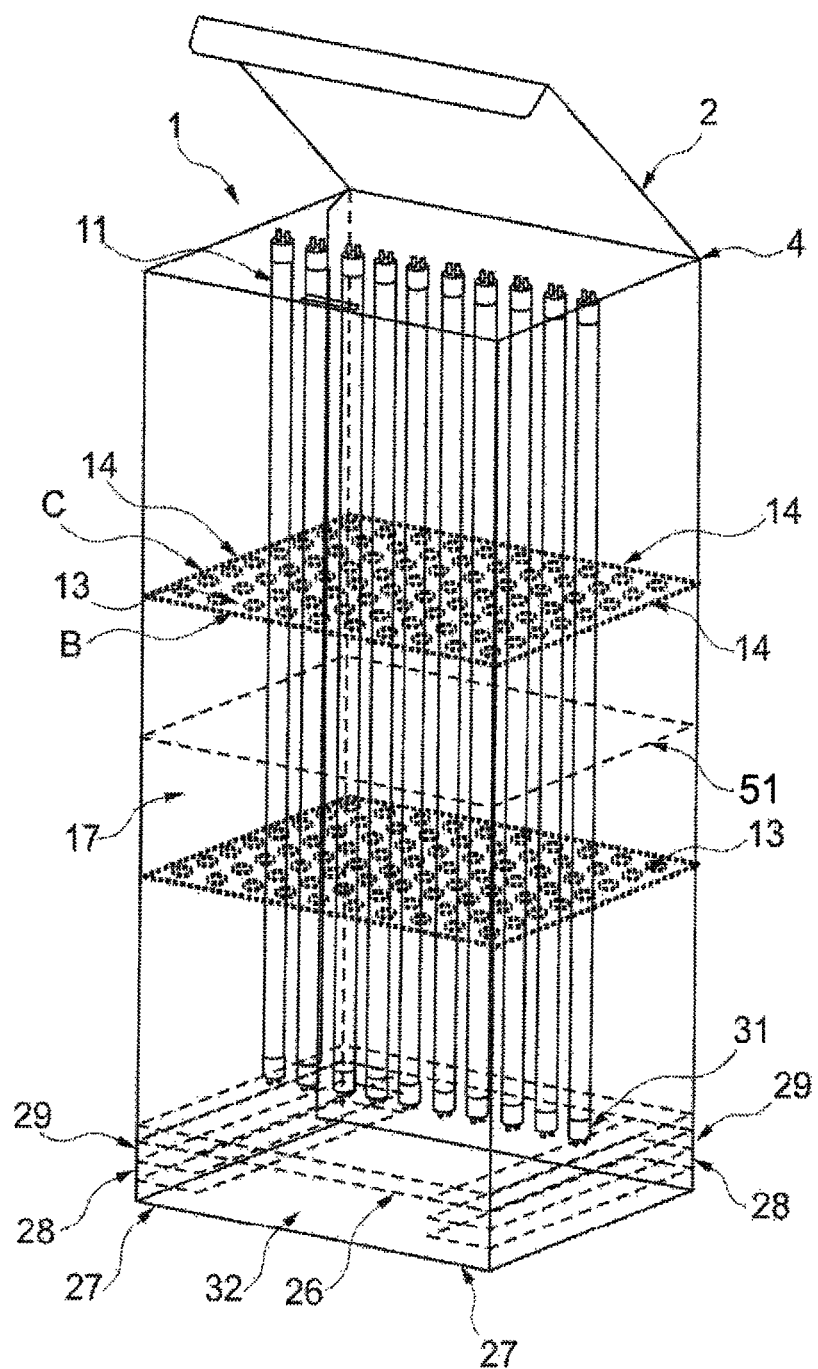
FIG. 6 is a perspective internal view of the container showing 2 lamp-support insertable layers and the base-support insertable layer in place in conjunction with spent lamps.

Preferably a pair of insertable lamp support layers 13 are inserted into container 1 upon assembly with the flaps 16 and 17 oriented in the same direction or, alternatively as shown in FIG. 4, so that extremities of flaps 16 and 17 may abut along centrally located line 22 (FIG. 6).

FIG. 4 depicts an exterior and interior pictorial view of a pair of insertable layers 13 in opposing folded configuration prior to assembly. As can be seen, the right hand view may be inverted to show the as-assembled configuration in the container of FIG. 6.

In FIG. 4 gripper edge 14 is shown in an alternative embodiment without the serrations 15 or perforations 18 but with flaps 16 and 17 in full folded contact as at 22.

FIG. 5 depicts the base support insertable layer 23 in unfolded or fully extended configuration. Base support area 26 is formable with dimensions D and E to match the interior of container 1 preferably for a tight mechanical and frictional fit fully transverse to the long axis of container 1. Slit lines 25, 24 extend partially through the cardboard of layer 23 to provide a precise fold with slit lines 24 being the reverse of 25 so that each end portion may fold accordion style into a 3 layer stack of layers 27, 28 and 29. As can be seen base layer 23 provides a fully transverse flat surface to yieldingly support spent lamps 11 and engage the lamp pins 30 (FIG. 2) in a uniform manner.

As can be seen a pair of insertable support layers 13 and a base support layer 23 may be readily assembled into a container 1 to form the reusable container 1 of the invention as shown in FIG. 6 without adhesives, staples or other permanent means of fixation between the layer elements and the exterior container. Similarly, upon completion of a cycle of use the container may be disassembled in reverse order into 4 individual components each of which may be readily returned to its flattened original condition without damage or significant deterioration of the flat transverse layer surfaces, the fitting edges such as the gripper edge 14, the flaps 16 and 17 or the bottom support layer 26. Once flattened the container in 4 parts may be stacked flat for palletization, wrapping and return shipment to a central source for reuse.

The absence of significant adhesives or other permanent fastenings permits the container to be simply disassembled in reverse order, collapsed and folded flat with a limited number of components, preferably 4.

Thus, the spent lamps may be recycled by non-permanent assembly of the 4 parts into container 1 of the invention, collection of the spent lamps and storage in the container 1 until it is substantially full, then simple closure and shipment to a recycling centre where the lamps may be removed and recycling while the container is disassembled and stacked ready for return to the central source.

FIG. 6 shows a partially filled container 1 in skeletal form with bottom support layer 26 engaging lamp pins 30 as at 1 and providing cushion space 32 by accordion folding of base layer 26. Support layers 1 are shown in the alternative configuration of FIG. 4 but are preferably assembled with each flap 16 and 17 placed in the container first.

Figure 7:
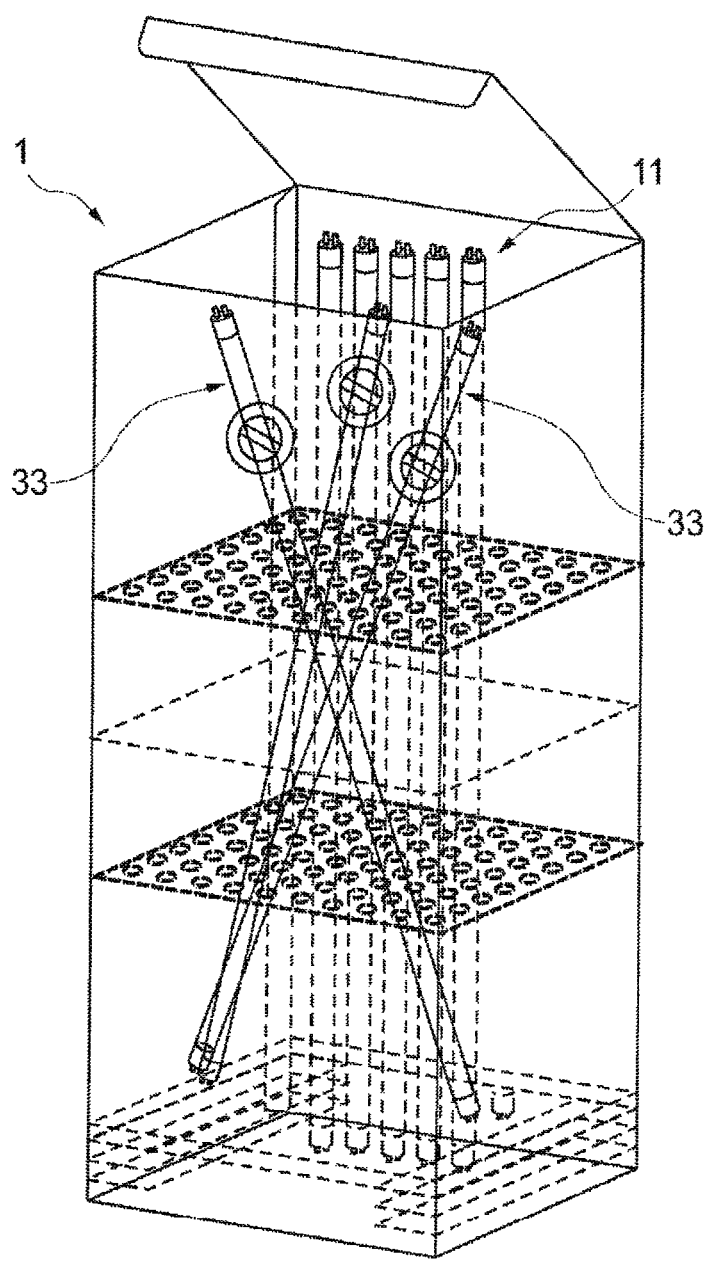
FIG. 7 is a perspective internal view of the container of FIG. 6 showing lamps loaded to the container in a improper manner.

In FIG. 7 is shown the partially loaded container of FIG. 6 also including 3 spent lamps as at 33 loaded into the container in a non-aligned improper manner. Array A of holes 12 in each of the insertable support layers 1 align with each other so as to assure that each spent lamp is aligned with the long axis of the container 1 and parallel to each other. Thus, the lamps may be loaded, stored and shipped lengthwise of the elongated container.

Preferably container 1 of the forgoing Figures is configured and dimensioned so that the long axis of the individual tubes and thus the container is substantially greater than either transverse axis B or C so that the container may be stored and loaded end-wise and the structural strength of the transverse support and bottom layers maintains the container 1 in a rectangular protective shape resistant to deformation, particularly upon shipping.

Further alternatively, the whole of container 1 may be fitted with a sealable bag layer to the exterior of the support layers 13 and 26.

While there has been shown and described what are considered to be preferred embodiments of the present invention, it will be apparent to those skilled in the art that various changes and modifications may be made therein without departing from the invention as defined in the appended claims.

I claim:

1. A reusable collapsible fluorescent tube container assembly, comprising:
   a plurality of tubular members, each tubular member having a top end and a bottom end, wherein each tubular member is comprised of a tubular body extending between said top end and said bottom end;
   elongated side walls standing in a vertical orientation parallel to the tubular members, each tubular member being in said vertical orientation;
   a bottom layer engaging said bottom end of each tubular member and supporting vertical pressure of each tubular member;

a bottom wall attached to said elongated side walls, said bottom layer being placed above said bottom wall; and at least a pair of independent tube transverse supports, being at intermediate distances along the side walls and engaging each tubular member along said tubular body between said top end and said bottom end;

wherein each support is comprised of a support layer and a pair of foldable flaps, said support layer being comprised of a matched array of tube support holes, wherein each matched array is in alignment with said plurality of tubular members, said tubular body of each tubular member being inserted through each matched array and maintained in said vertical orientation relative to each support so as to exert only lateral pressure on each tube support hole, wherein each support layer is extended transversely from side wall to side wall and releasably engaged with the side walls, wherein the supports deform the side walls into a fixed position relative to each other and the bottom layer, said plurality of tubular members maintaining separation from the side walls and said bottom layer, and wherein the supports maintain position of said elongated side walls relative to said bottom layer and position of said plurality of tubular members relative to said elongated side walls and said bottom layer, said matched array maintaining each tubular member in said vertical orientation and in position relative to an adjacent tubular member, each tubular member standing within each tube support hole.

2. The reusable collapsible fluorescent tube container assembly, as claimed in claim 1, further comprising deformations in said elongated side walls, the tube supports engaging said deformations.

3. The reusable collapsible fluorescent tube container assembly, as claimed in claim 1, wherein the flaps engage and extend along said elongated side walls upon assembly.

4. The reusable collapsible fluorescent tube container assembly, as claimed in claim 1, wherein the support layer comprises at least one serrated edge to engage the side walls.

5. The reusable collapsible fluorescent tube container assembly, as claimed in claim 1, wherein said bottom layer comprises a pair of opposing foldable subdivided accordion flaps, each flap being subdivided into at least three parts by slit lines, said slit lines alternating from one side of said bottom layer to another side, each flap being folded in accordion style to form a raised transverse flat surface.

6. The reusable collapsible fluorescent tube container assembly, as claimed in claim 4, wherein the one serrated edge joins a respective edge of the flaps, the support layer being along a fold line, upon assembly.

7. The reusable collapsible fluorescent tube container assembly, as claimed in claim 4, wherein the one serrated edge comprises a plurality of elongated perforations along the support.

8. The reusable collapsible fluorescent tube container assembly, as claimed in claim 7, wherein the perforations separate and form a fold line, the flaps being pivoted relative to said support layer along said fold line.

9. The reusable collapsible fluorescent tube container assembly, as claimed in claim 7, wherein the support layer is scored on at least one side.

10. The reusable collapsible fluorescent tube container assembly, as claimed in claim 3, wherein at least one pair of the flaps engage each other when folded for deformation along a line of engagement.

11. The reusable collapsible fluorescent tube container assembly, as claimed in claim 4, wherein the one serrated edge joins a respective edge of the flaps, the support layer being along a fold line.

12. The reusable collapsible fluorescent tube container assembly, as claimed in claim 11, wherein the one serrated edge comprises a plurality of elongated perforations through the support.

13. The reusable collapsible fluorescent tube container assembly, as claimed in claim 12 wherein the perforations substantially separated and provide separate and form a fold line, the flaps being pivoted relative to said support layer along said fold line.

14. The reusable collapsible fluorescent tube container assembly, as claimed in claim 13, wherein the support layer is scored on at least one side.

* * * * *